(12) United States Patent
Rao et al.

(10) Patent No.: US 9,189,438 B2
(45) Date of Patent: Nov. 17, 2015

(54) METHOD AND APPARATUS FOR DYNAMIC POWER SAVING WITH FLEXIBLE GATING IN A CROSS-BAR ARCHITECTURE

(71) Applicant: QUALCOMM Incorporated, San Diego, CA (US)

(72) Inventors: Hari Rao, San Diego, CA (US); Venugopal Boynapalli, San Marcos, CA (US); Kevin Robert Bowles, Mission Viejo, CA (US); Vijay Bantval, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 13/799,286

(22) Filed: Mar. 13, 2013

(65) Prior Publication Data

US 2014/0281112 A1 Sep. 18, 2014

(51) Int. Cl.
G06F 13/40 (2006.01)

(52) U.S. Cl.
CPC ............ G06F 13/40 (2013.01); *Y02B 60/1228* (2013.01); *Y02B 60/1235* (2013.01)

(58) Field of Classification Search
CPC ..... G06F 13/40; G06F 13/4004; G06F 13/42; G06F 1/10; G06F 1/12
USPC .................................. 710/317, 306; 713/400
See application file for complete search history.

(56) References Cited

U.S. PATENT DOCUMENTS

| 3,509,331 | A * | 4/1970 | Cutaia ............................ 705/16 |
| 6,483,755 | B2 | 11/2002 | Leung et al. |
| 2003/0233508 | A1 * | 12/2003 | Bosshart ....................... 710/316 |
| 2006/0143382 | A1 * | 6/2006 | Damaraju et al. ............ 711/118 |
| 2009/0268540 | A1 * | 10/2009 | Rao et al. ...................... 365/226 |
| 2011/0099405 | A1 | 4/2011 | Voutilainen |
| 2012/0017107 | A1 * | 1/2012 | Lee ................................ 713/400 |
| 2013/0246681 | A1 * | 9/2013 | Rao et al. ...................... 710/306 |

FOREIGN PATENT DOCUMENTS

EP 0594198 A2 4/1994

OTHER PUBLICATIONS

Kumar, "Holistic design for multi-core architectures", 2006, University of California, San Diego, Source: Google URL: http://passat.crhc.illinois.edu/rakeshk/thesis.pdf, 216 pages, Abstract; p. 74 Para 1,2; p. 113 Para 1; p. 151 Para 1,2,3.
Lee, et al., "Low-Power Network-on-Chip for High-Performance SoC Design," IEEE Transactions on Very Large Scale Integration (VLSI) Systems, vol. 14, No. 2, Feb. 2006, pp. 148-160.

* cited by examiner

*Primary Examiner* — Tim T Vo
*Assistant Examiner* — Phong H Dang
(74) *Attorney, Agent, or Firm* — Haynes and Boone, LLP (57) ABSTRACT

Various aspects of dynamic power reduction in a bus communication architecture are described herein as embodied in an XBAR architecture that provides flexible gating of multiple paths and repeater circuitry to allow any of a number of selected clients to communicate with any of the other interconnected clients while reducing dynamic power consumption by disabling unused repeater circuitry in the bus communication architecture.

7 Claims, 10 Drawing Sheets

METHOD AND APPARATUS FOR DYNAMIC POWER SAVING WITH FLEXIBLE GATING IN A CROSS-BAR ARCHITECTURE

BACKGROUND

1. Field

The present disclosure relates generally to an integrated circuit (IC) bus architecture. More specifically, the present disclosure relates to a method and apparatus for power saving and flexible gating in a low power, on-chip bus architecture for interconnecting selectable client circuitry with selected path segments.

2. Background

Integrated circuit bus architectures are designed to interconnect multiple client subsystems (or simply, clients), using a bus so that each client may communicate with another client on the bus. A particular type of bus architecture, referred to as a crossbar (XBAR) architecture, provides a switch topology for allowing select clients to simultaneously access each other. Specifically, these clients may write to and read from the XBAR in an N-way communication scheme, where multiplexing is used to sample specific clients on a cycle-by-cycle basis. The multiplexer select circuitry determines which clients can write to the XBAR and which clients can listen to the XBAR.

The use of XBARs is becoming increasingly common for implementing client-to-client connectivity in high-speed circuitry such as communication and graphics processing circuitry. However, operation of XBAR at high frequencies generally involves the use of repeaters and latch repeaters, which increase dynamic power consumption. For communication processing circuitry such as those used for modems in wireless devices, reducing dynamic power consumption is paramount to enabling practical functionality in modern telecommunication standards. Further, the reduction of dynamic power consumption has to be achieved while avoiding increased latency or logic complexity.

Thus, it would be desirable to be able to address the issues identified above to be able to provide significant increased operating time for devices while not reducing performance significantly.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspect of the disclosed approach provides power saving for processing systems by reducing dynamic power use in a bus architecture such as an XBAR architecture. In one aspect of the disclosed approach, repeaters in the XBAR architecture are enabled based on a particular path to be used. In one aspect of the disclosure, repeaters are enabled/disabled based on the particular clients that are selected to communicate with each other, which allows unused sections of the XBAR architecture to be gated off. Further, on-time enabling and late disabling prevents data loss while still providing overall dynamic power consumption.

One aspect of the disclosed approach provides a bus system including a plurality of clients coupled by at least one communication path, wherein a first client is configured to be coupled to a subset of clients in the plurality of clients by a first communication path; at least one switched repeater located at a position along a length of the first communication path and configured to divide the first communication path into multiple portions; and control logic configured to disable the at least one switched repeater associated with any unused portion of the multiple portions of the first communication path.

Another aspect of the disclosed approach provides a bus system that includes means for coupling a plurality of clients to at least one communication path, wherein a first client is configured to be coupled to a subset of clients in the plurality of clients by a first communication path; at least one switched repeater located at a position along a length of the first communication path and configured to divide the first communication path into multiple portions; and control means configured to disable the at least one switched repeater associated with any unused portion of the multiple portions of the first communication path.

Yet another aspect of the disclosed approach provides a method for dynamic power saving that includes coupling a plurality of clients to at least one communication path, wherein a first client of the plurality of clients is configured to be coupled to a subset of other clients in the plurality of clients by a first communication path; dividing the first communication path into multiple portions via at least one switched repeater located at a position along a length of the first communication path; and disabling one or more switched repeaters of the at least one switched repeater associated with any unused portion of the multiple portions of the first communication path.

Still yet another aspect of the disclosed approach provides an apparatus that includes a processor; a plurality of clients; at least one communication path configured to couple the plurality of clients, wherein the at least one communication path comprises a first communication path configured to couple the processor to a subset of clients in the plurality of clients; at least one switched repeater located at a position along a length of the first communication path and configured to divide the first communication path into multiple portions; and control logic configured to disable the at least one switched repeater associated with any unused portion of the multiple portions of the first communication path.

These and other aspects of the disclosure will become more fully understood upon a review of the detailed description, which follows.

BRIEF DESCRIPTION OF THE DRAWINGS

These and other sample aspects of the disclosure will be described in the detailed description that follow, and in the accompanying drawings.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of dynamic power reduction in a bus communication architecture are described herein as embodied in an XBAR architecture that provides flexible gating of multiple paths and repeater circuitry to allow any of a number of selected clients to communicate with any of the other interconnected clients while reducing dynamic power consumption, as illustrated in the following figures and described herein.

Figure 1:
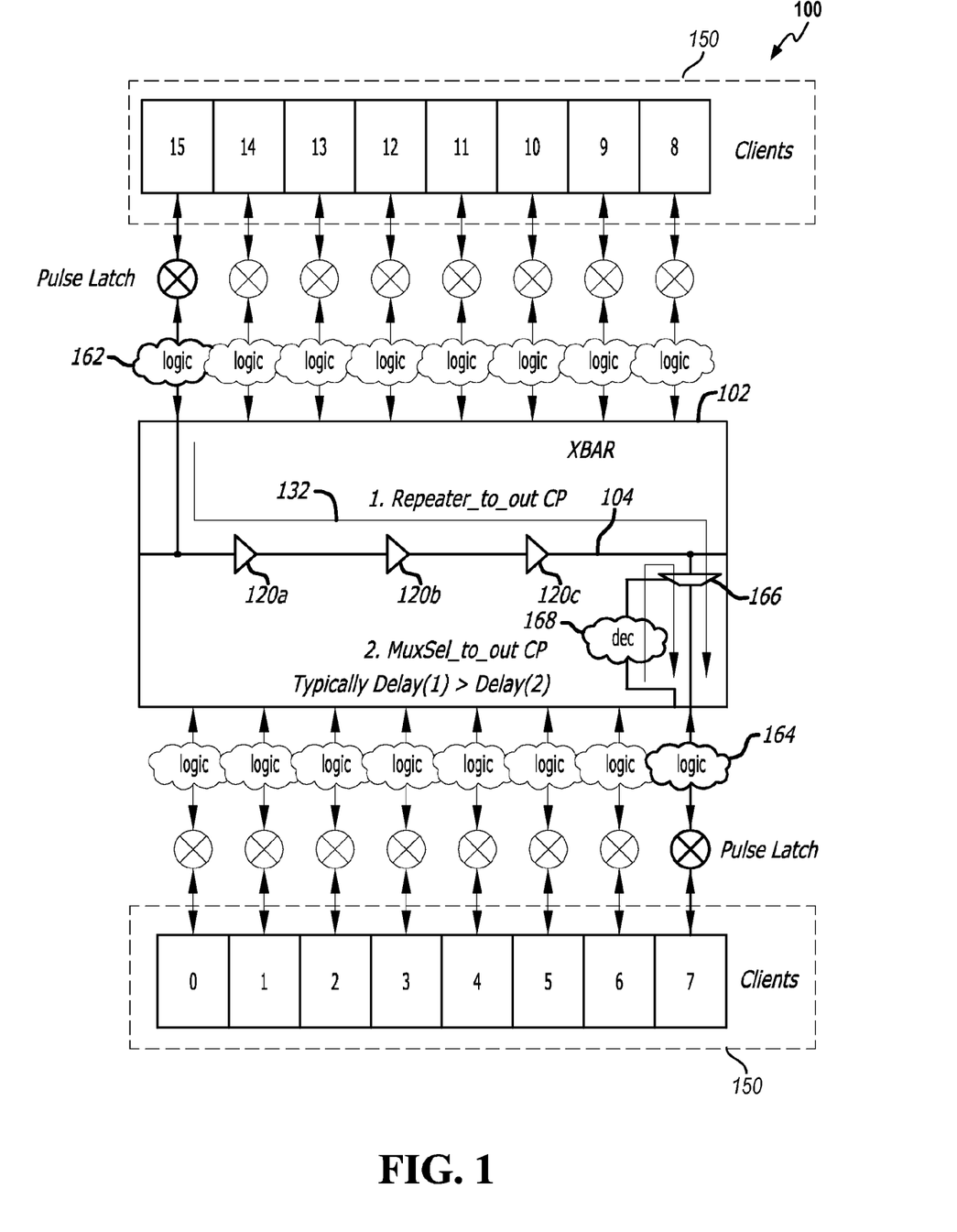
FIG. 1 is a block diagram illustrating a generic crossbar (XBAR) architecture where an XBAR may be configured to connect a number of clients.

In order to provide a general understanding of the XBAR architecture, FIG. 1 is provided to illustrate a generic XBAR architecture 100 where an XBAR 102 connects a plurality of clients 150 (e.g., clients 0-15). Each client in the plurality of clients 150 has a write port through which it may broadcast data on a dedicated write "bus", and essentially the XBAR 102 contains these buses. Each client also has a read port through which it may receive data from other clients when the read port is selectively coupled to any one of the busses. The specific client from which a "listening" client may receive data may be selected by a listening client MUX associated with the listening client, where the listening client MUX may tap into any of the busses. A broadcast by any client on its bus may be received by any client (including the broadcasting client itself). In other words, a client is not necessarily limited to broadcasting while the rest of the clients listen. Thus, in general, any number of clients in the plurality of clients 150 may be listening to data that is being broadcast.

Because each of the busses in the XBAR 102, referred to herein as XBAR tracks, is a communication path that may be of a sufficient length to suffer from RC losses during high speed communications, repeaters are often used to mitigate these losses. Specifically, one or more repeaters are inserted at various points along each XBAR track to reduce RC loss between the clients of the plurality of clients 150. For example, referring again to FIG. 1, in an XBAR track 104 between clients 7 and 15 of the plurality of clients 150, a plurality of repeaters 120*a-c* may be used to provide compensation for RC losses on the communication path between a connection logic 162 at the client 15 of the plurality of clients 150 to an N-way multiplexer 166 and a connection logic 164 at the client 7 of the plurality of clients 150. The number of repeaters for any XBAR track and their insertion points thereon may be based on a variety of factors, including a frequency goal for which the XBAR track is optimized. As each client requires repeaters, a read MUX, a MUX decoder, and taps into the XBAR 102 to sample any broadcasting client, as further described below, a certain minimum amount of space will be necessary to meet any frequency goals. This space also determines the minimum XBAR track length needed for the clients to be juxtaposed. In one aspect of the disclosed approach, a maximum length is affected by chip layout requirements as the clients may be spread apart on the chip. Once a length of each XBAR track is known, repeaters are spaced apart on each XBAR track to minimize delay and meet the frequency goal. The number of insertion points and size of each repeater are minimized to reduce power, area, and leakage issues attributable to use of the repeaters.

In the XBAR architecture 100, there are two classic critical paths. The first critical path involves a data flow through repeaters between clients that are separated from each other by the longest data path distance, which in FIG. 1 is represented by an example of a Repeater_to_out critical path (CP) 132 from client 15 to client 7 of the plurality of clients 150. Continuing with the example, the other critical path is a path represented by a path through a read client MUX decoder such as a read client MUX decoder 168 to an output such as an output to the connection logic 164, show by a MuxSel_to_out CP 134. A first signal travelling over the Repeater_to_out CP 132 is provided along with a second signal travelling over the MuxSel_to_out CP 134 to enable communication from the client 15 to the client 7 of the plurality of clients 150, where the N-way multiplexer 166 is controlled by the read client MUX decoder 168 to enable data traffic sent by the client 15 on the XBAR track 104 to be received by the client 7. Typically, the Repeater_to_out CP 132 (i.e., the repeater path) presents a worse case delay compared to the MuxSel_to_out CP 134.

Figure 2:
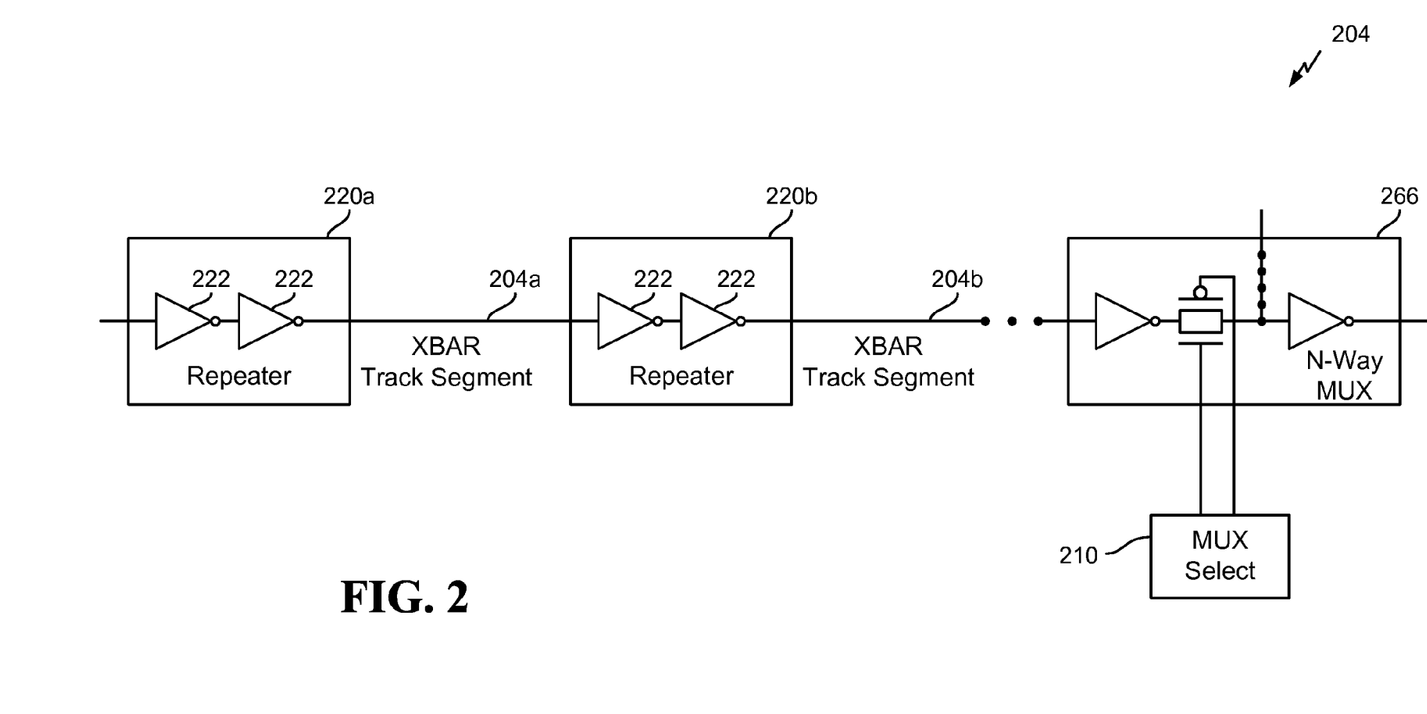
FIG. 2 is a block diagram illustrating an XBAR track in the generic XBAR architecture of FIG. 1.

Referring to FIG. 2, a better understanding of the XBAR architecture 100 of FIG. 1 may be gained by a description of a portion of the XBAR track 104 as illustrated in an XBAR track 204. The XBAR track 204 includes XBAR track segments 204*a-b* coupled to a plurality of normal repeaters 220*a-b*, which correspond to the repeaters 120*a-b* of the plurality of repeaters 102*a-c*, and an N-way multiplexer 266, which corresponds to the N-way multiplexer 166. Thus, the repeaters 120*a-b* in the XBAR architecture 100 of FIG. 1 are illustrated as the plurality of normal repeaters 220*a-b*. Each normal repeater in the plurality of normal repeaters 220*a-b* includes a pair of inverters 222 coupled together in series. Multiplexer select circuitry 210, which may be implemented as a part of the MUX decoder 168, controls the operation of the N-way multiplexer 266 to enable data traffic on the XBAR track segments of the XBAR track 204, including XBAR track segments 204a-b, to be passed through to the reading client.

Figure 3:
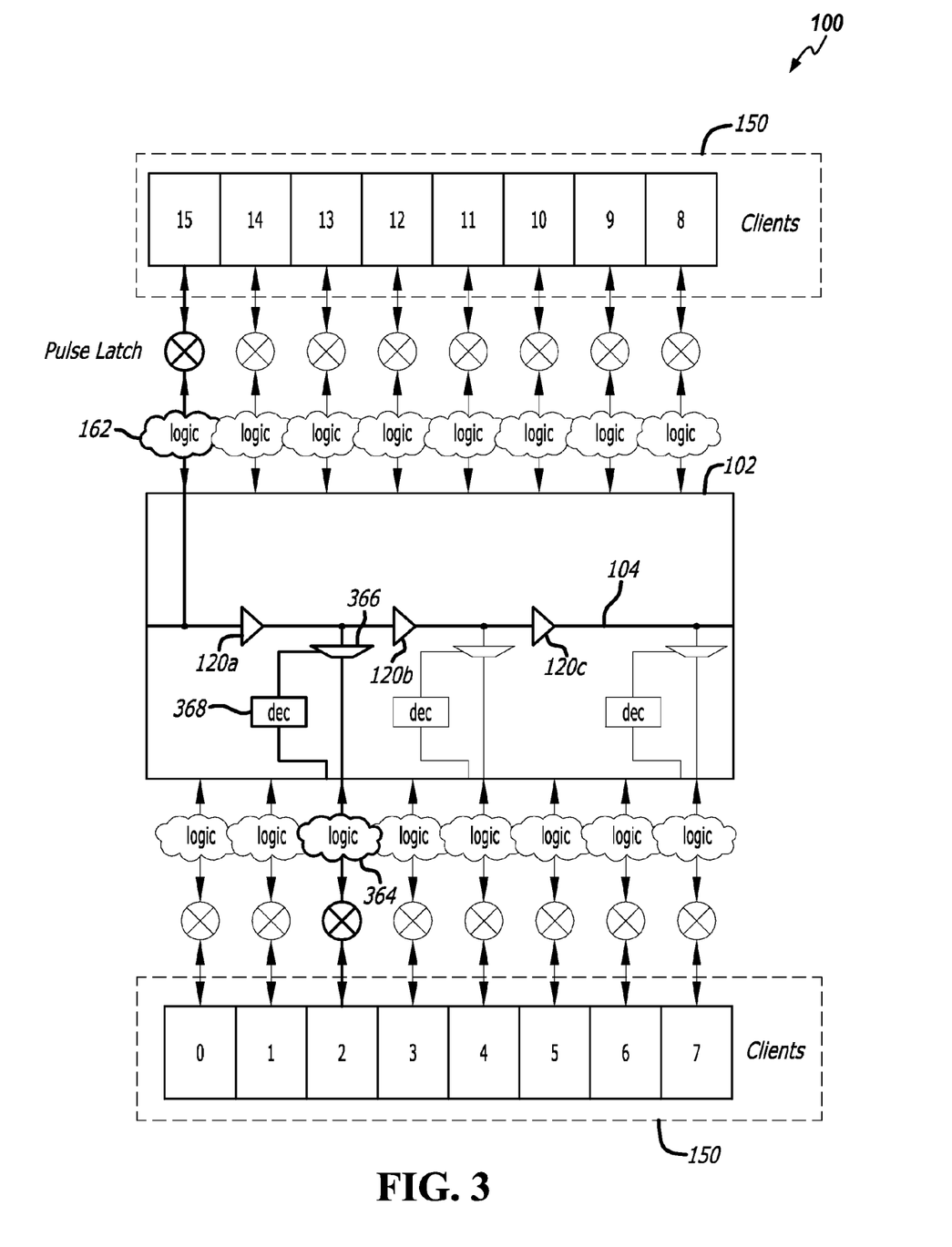
FIG. 3 is a block diagram illustrating a scenario of wasted active power consumption that may be encountered by the generic XBAR architecture of FIG. 1.

A deficiency of an XBAR architecture such as the XBAR architecture 100 of FIG. 1 may be described with reference to FIG. 3, where, even in cases when two clients such as the client 15 and a client 2 of the plurality of clients 150 are sufficiently close to not require communication to be passed through an entire length of an XBAR track such as the XBAR track 104, all the repeaters along the XBAR track 104 are still active and powered throughout the entire timespan of a transaction. For example, for the client 2 to receive data that the client 15 broadcasts on the XBAR track 104, only the repeater 120a needs to be powered so that the data may pass through a client read MUX 366 and a logic 364, as selected by a decoder 368, to the client 2.

Figure 7:
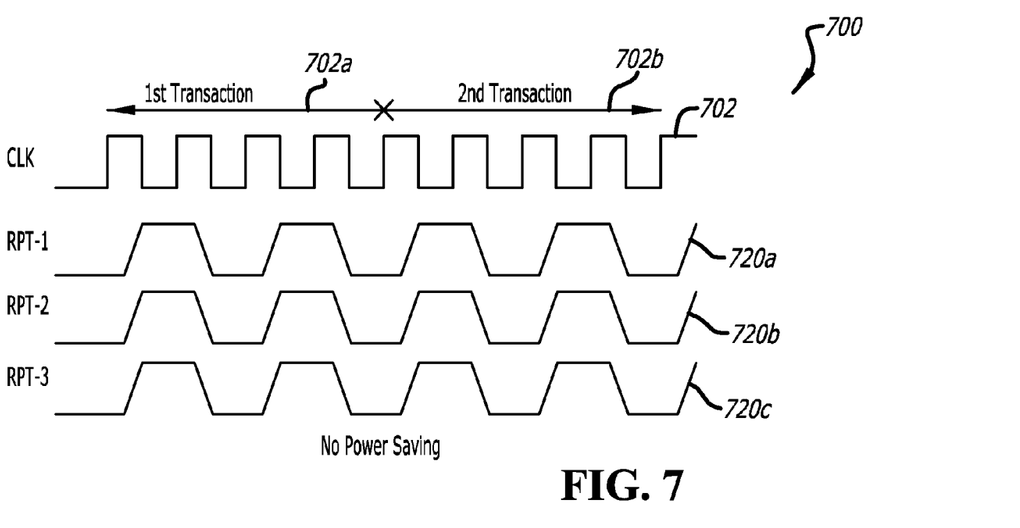
FIG. 7 is a waveform plot illustrating the wasted active power consumption that may be encountered by the generic XBAR architecture of FIG. 1.

Referring to FIG. 7, a waveform plot 700 of the waveforms for the pulses for the three repeaters 120a-c in the XBAR track 104 between the client 15 and the client 2 of the plurality of clients 150, labeled RPT-1 720a, RPT-2 720b, and RPT-3 720c, show that these repeaters consume power the entire time an active transaction exists. Two transactions 702a-b are illustrated over a clock (CLK) cycle plot 702. Because all repeaters remain active throughout a transaction, dynamic power is wasted over both of these transactions because repeater circuitries that are not being used (e.g., repeaters 120b-c) are still active throughout the entire transaction. As each transaction may last several clock (CLK) cycles, over time this wasted power consumption may unnecessarily reduce overall operational time where a device is supported by battery power. The wasted power consumption may also generate heat that is undesirable.

Figure 4:
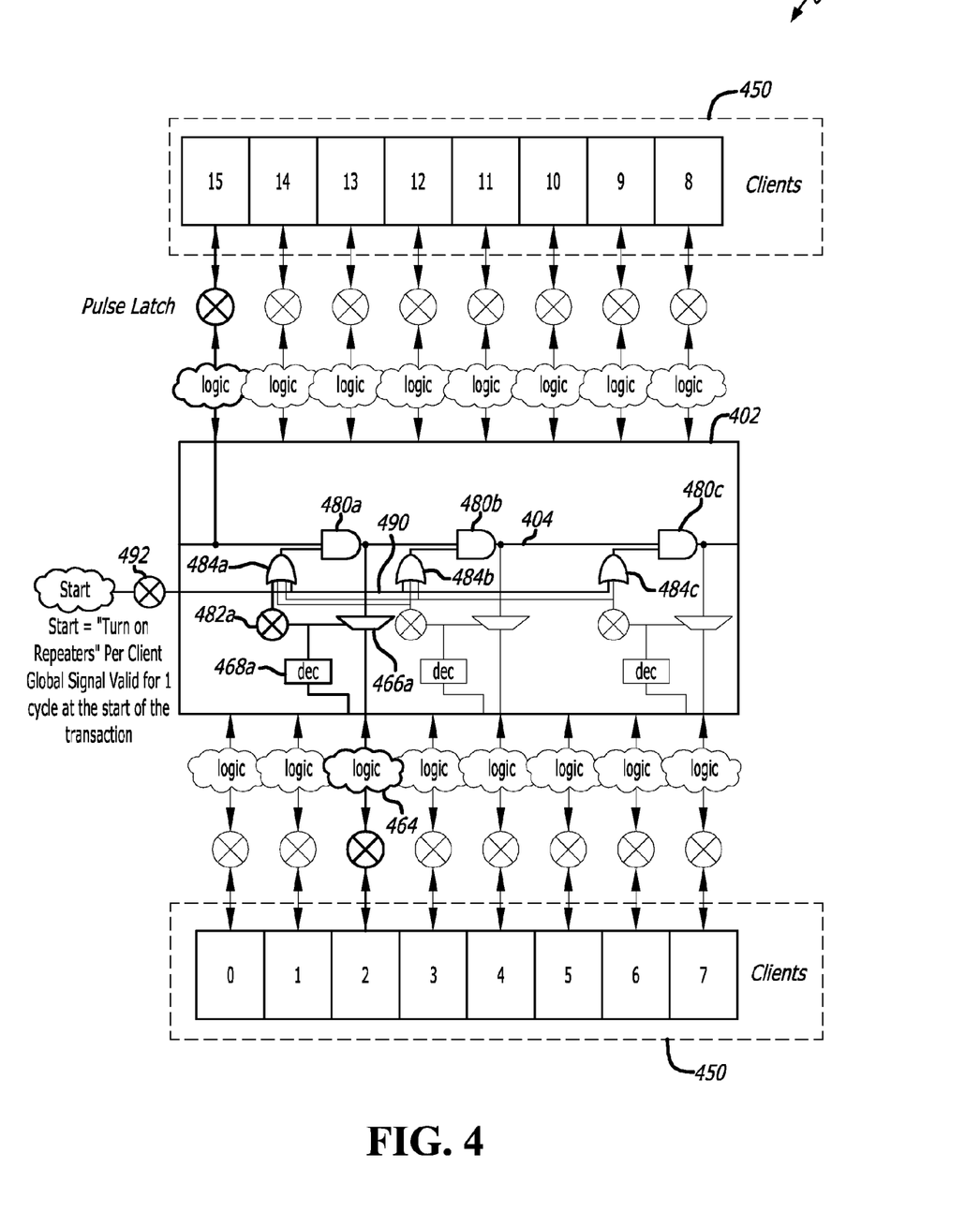
FIG. 4 is a block diagram illustrating an XBAR architecture that employs switched repeaters that minimizes wasted active power consumption that may be encountered by the generic XBAR architecture of FIG. 1.

To address active power consumption issues in XBAR architectures, in accordance with various aspect of the disclosed approach, FIG. 4 illustrates the use of switched repeaters in an XBAR architecture 400 instead of using normal repeaters. A plurality of switched repeaters may be inserted into each XBAR track, an example of which as illustrated is a plurality of switched repeaters 480a-c that segments a communication path of an XBAR track 402 for a client 15 of a plurality of clients 450 into multiple portions. Any one of the plurality of switched repeaters 480a-c may be turned off based on unnecessary portions of the XBAR track 402 to save power. For example, to address the scenario illustrated in FIG. 3, where a client 15 is broadcasting data and only a client 2 of a plurality of clients 450 is listening, only the switched repeater 480a needs to be activated so that the data may be received by the client 2 through a listening client read MUX 466a as controlled by a decoder 468a and a logic 464.

Figure 6:
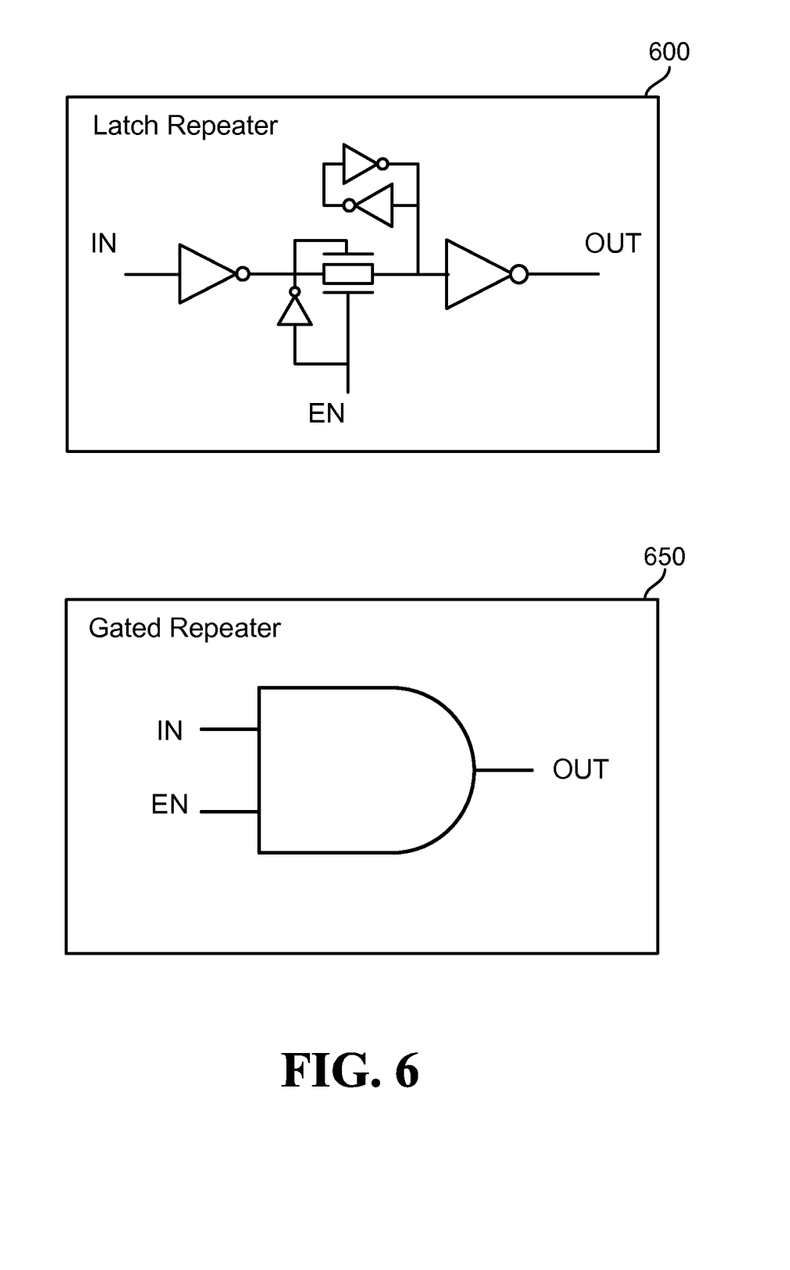
FIG. 6 is a block diagram illustrating examples of switched repeater implementations that may be used in the XBAR architecture of FIG. 4.

FIG. 6 illustrates a latch repeater 600 and a gated repeater 650, each of which may be used to implement the switched repeater for use in the XBAR architecture 400 in accordance with various aspects of the disclosed approach. Both the latch repeater 600 and the gated repeater 650 include a repeater enable input (EN). When the repeater enable input is turned on (EN is HIGH), data traffic can flow through the repeater from left to right, i.e., data traffic may flow from an input (IN) to an output (OUT) of the repeater. When the repeater enable input is turned off (EN is LOW), data flow is automatically cut off from the rest of the XBAR track 404 at the repeater. In the case of switched repeaters such as the latch repeater 600, any latched value is maintained during the time the repeater enable input is turned off Although various implementations of repeaters may vary (e.g., gated or latched-Flip/Flops), a general characteristic of the repeaters suitable for use herein should preferably include a dormant state in addition to an active state. Further, gated repeaters may be used if use of state elements, such as latch repeaters, is undesired because of the additional overhead that may be required for checking a state of the state element when it enters the active state.

Proper control of switched repeaters such as the gated repeater 650 or the latch repeater 600 provides reduced dynamic power consumption while minimizing any introduced delay. As the specific example provided above illustrates, the XBAR architecture 400 includes control logic that may include selection circuitry used to couple selected clients to a particular XBAR track such as the XBAR track 404, and also enable circuitry that is used to enable the switched repeaters located on the communication path between the selected clients. The switched repeaters that are not enabled on a given communication cycle may gate off the unused portions of the path and, in the case of use of latch repeaters such as the latch repeater 600, maintain the data that was latched on a previous cycle. Thus, the disclosed approach reduces dynamic power by selectively gating off unused portions of the paths during a communication cycle between selected clients.

It should be noted that control of the switched repeaters may be subject to certain constraints. For example, an error known as a "switching hole" may occur when a repeater that is supposed to be ON is actually OFF, such as when a repeater enable signal is turned off at the end of a previous transaction. To prevent switching holes, in one aspect of the disclosed approach, all repeaters are kept ON during the first cycle of each transaction, during which a list of the switched repeaters that are needed and, consequently, should remain enabled for the transaction, is generated. This list will be referred to herein as an enabled repeater list and may be populated by first determining which clients need to be ON during the transaction, and then identifying the switched repeaters that are associated with those clients. For example, by a second cycle, identities of which switched repeaters may be turned off have been determined based on which read clients that are supposed to be ON. In one aspect of the disclosed approach, each switched repeater that is to remain ON is sent, or may continue to receive, the repeater enable signal. In another aspect of the disclosed approach, where a switched repeater may be configured to remain ON unless the switched repeater is explicitly turned off, all unnecessary switched repeater may be sent a disable signal after the first transaction.

Figure 5:
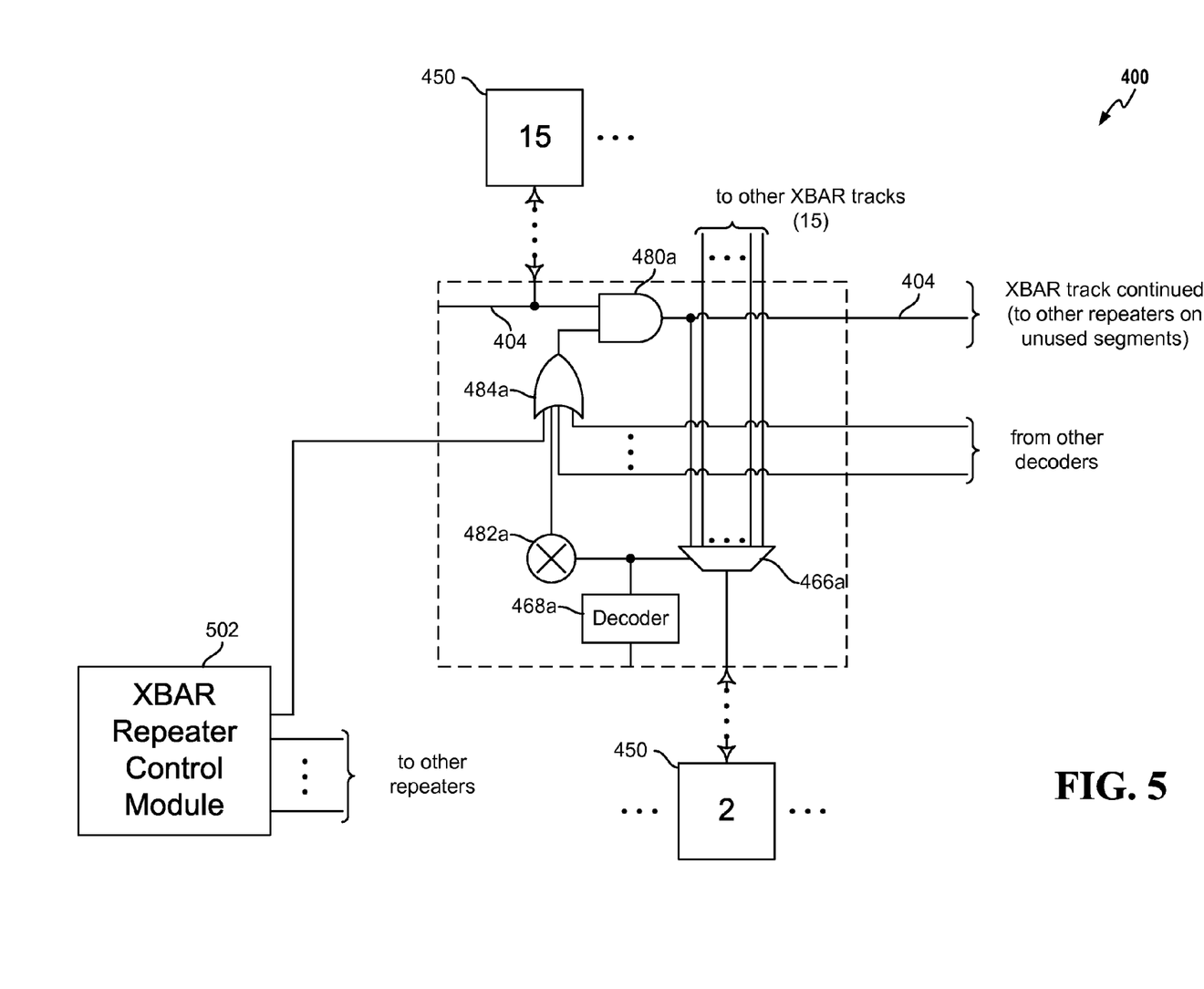
FIG. 5 is a block diagram illustrating a portion of the XBAR architecture of FIG. 4 to describe an operation of switched repeaters that minimizes wasted active power consumption.

In accordance with various aspects of the disclosed approach, because information needed to control the switched repeaters may not be available before a transaction, all switched repeaters should be enabled during a first cycle of any transaction. In one aspect of the disclosed approach, as illustrated in FIG. 4, to provide this "on-time enable" feature, a global start signal enables all switched repeaters at the beginning of a transaction to prevent "switching holes", a situation where data may be lost because a disable status of a particular XBAR repeater is yet to be determined Referring to FIG. 4 while also referring to FIG. 5, an example of the control logic such as an XBAR repeater control module 502 may enable the plurality of switched repeaters 480a-c through a plurality of OR-gates 484a-c during any cycle, such as the first cycle of a transaction, to avoid the possibility of a switching hole. Thus, in one aspect of the disclosed approach, the XBAR repeater control module 502 may send an enable, or "start," signal using a register 492 to all switched repeaters through a first cycle of each transaction so that all switched repeaters on the XBAR track 404 may remain enabled. After the first cycle, the XBAR repeater control module 502 may then deactivate the register 492 and not continue to send out the enable signal. Any switched repeaters that need to remain enabled will receive an enable signal from a decoder circuit. For example, again referring to the scenario used in FIG. 3, only the switched repeater 480a need to remain enabled after the first cycle in the transaction as only client 2 needs to receive the data broadcasted by client 15. Thus, the switched repeater 480a will continue to receive an enable signal from the decoder 468a through a register 482a and the OR-gate 484a.

By enabling all switched repeaters during the first clock cycle, no information regarding which switched repeater needs to be enabled is needed and switching holes may be avoided because all switched repeaters are turned on. Thus, although the disclosed approach may not reduce dynamic power consumption during a first cycle of a transaction, a reduction in overall dynamic power consumption is achieved from any multi-cycle transaction because one or more of the switched repeaters 480a-c for the XBAR track 404 may be turned off after the first cycle.

Figure 8:
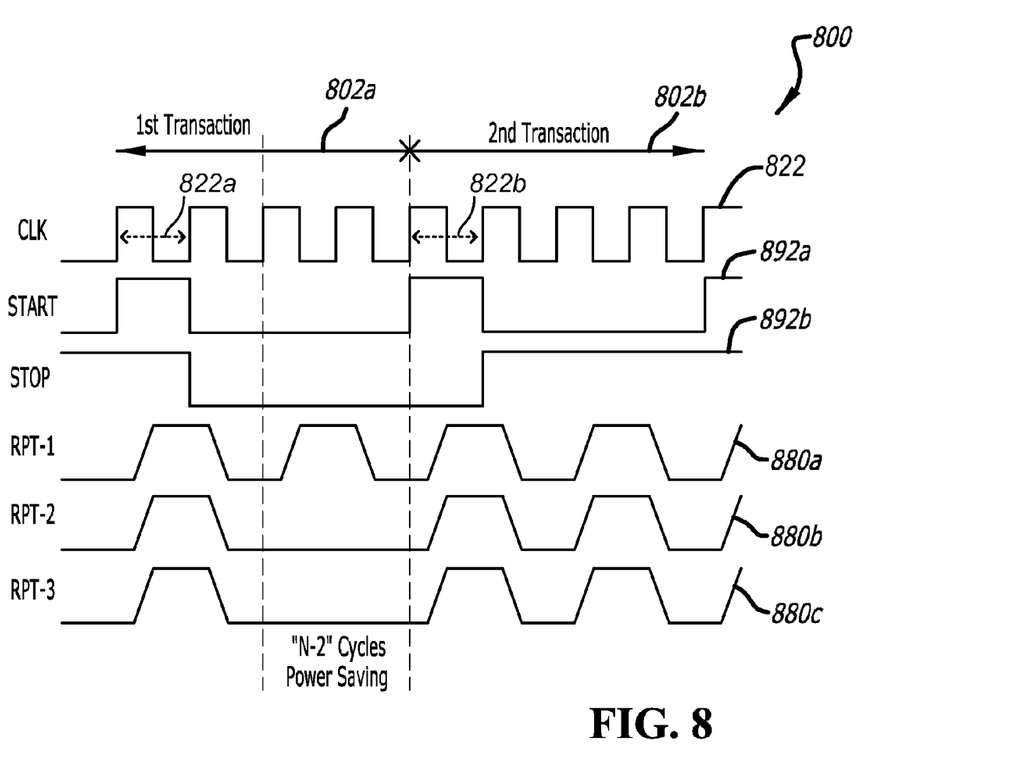
FIG. 8 is waveform plot illustrating an operation of the XBAR architecture of FIG. 4 that minimizes the wasted active power consumption that may be encountered by the generic XBAR architecture of FIG. 1.

Referring to FIG. 8, which includes a waveform plot 800 that illustrates an operation of the XBAR architecture 400 as described above, where a clock (CLK) signal 822 includes multiple clock cycles over which two transactions, including a first transaction 802a and a second transaction 802b, are shown. A control signal such as a START signal 892a may be used to enable switched repeaters for a beginning portion of a transaction to avoid switching holes as described above. For example, the START signal 892a may be HIGH for a beginning portion of the first transaction 802a, which as illustrated as is a first cycle 822a of the first transaction 802a, as well as for a beginning portion of the second transaction 802b, which as illustrated as is a first cycle 822b of the second transaction 802b. Another control signal, illustrated as a STOP signal 892b, may be used to disable the switched repeaters that are not needed for a particular transaction. Conceptually, in accordance with various aspects of the disclosed approach, a control signal for any repeater segment may include the characteristics of both the START signal 892a and the STOP signal 892b. In other words, a control signal for any repeater segment may behave as a combination of the START signal 892a and the STOP signal 892b based on what state the repeater segment should be in during a particular clock cycle as determined by the control block.

For the first transaction 802a, it may be seen that the states of the switched repeaters 480b and 480c, as represented in FIG. 8 by waveforms RPT-2 880b and RPT-3 880c, respectively, are in a low power state after the first cycle 822a of the first transaction 802a while a waveform RPT-1 880a illustrates that the switched repeater 480a remain enabled throughout all cycles of the first transaction 802a. In the second transaction 802b, where in another exemplary scenario other clients in the plurality of clients 450 also need to listen to the data broadcast by the client 15 on the XBAR track 404 (e.g., clients on repeater segments that are downstream from the switched repeater 480a), it may be seen from the waveforms RPT-1 880a, RPT-2 880b, and RPT-3 880c that the switched repeaters 480b and 480c remain enabled along with the switched repeater 480a.

In general, for an N-cycle transaction, the first cycle is used to generate/propagate the control signals for the repeater disable logic. After the first cycle, the control block would have determined a desired state for each of the repeater segment. However, especially where gated repeaters are used, there may still be some toggling on the repeater segments during a second cycle as they settle out (such as from say high to low). In effect, the flexible gating scheme configured in accordance with one aspect of the disclosed approach results in dynamic power reduction for gated repeaters that are turned off for a number N−2 cycles of any transaction, based on client traffic. In another aspect of the disclosed approach, for latched repeaters, dynamic power reduction may be achieved from the repeaters being turned off for a number N−1 cycles of any transaction. It yet another embodiment, repeater control signals may be generated and distributed earlier than the beginning of a transaction so that dynamic power may be saved for all N cycles of the transaction, and with no switching holes.

Figure 9:
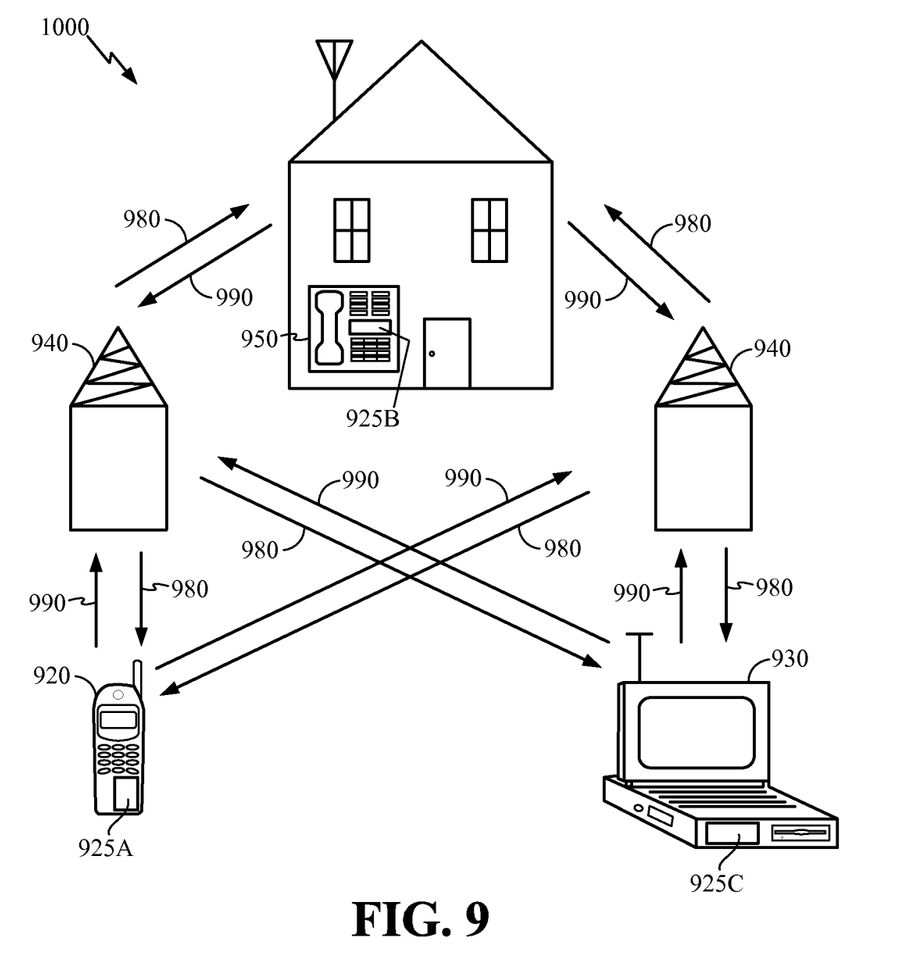
FIG. 9 is a block diagram illustrating an exemplary wireless communication system in which an XBAR circuitry configuration as described herein may be advantageously employed.

FIG. 9 shows an exemplary wireless communication system 900 in which a configuration of the disclosed XBAR architecture may be advantageously employed. For purposes of illustration, FIG. 9 shows three devices such as remote units 920, 930, and 950 and two base stations 940. It will be recognized that wireless communication systems may have many more remote units and base stations. Remote units 920, 930, and 950 may include XBAR circuitry 925A, 925B, and 925C, respectively to couple systems therein such as a processor with other clients that may include graphics subsystems. FIG. 9 shows forward link signals 980 from the base stations 940 and the remote units 920, 930, and 950 and reverse link signals 990 from the remote units 920, 930, and 950 to base stations 940.

In FIG. 9, the remote unit 920 is shown as a mobile telephone, remote unit 930 is shown as a portable computer, and remote unit 950 is shown as a fixed location remote unit in a wireless local loop system. For example, the remote units may be cell phones, hand-held personal communication systems (PCS) units, portable data units such as personal data assistants, or fixed location data units such as meter reading equipment. Although FIG. 9 illustrates remote units, which may employ XBAR circuitry according to the teachings of the disclosure, the disclosure is not limited to these exemplary illustrated units. For instance, XBAR circuitry according to configurations of the present disclosure may be suitably employed in any device.

Figure 10:
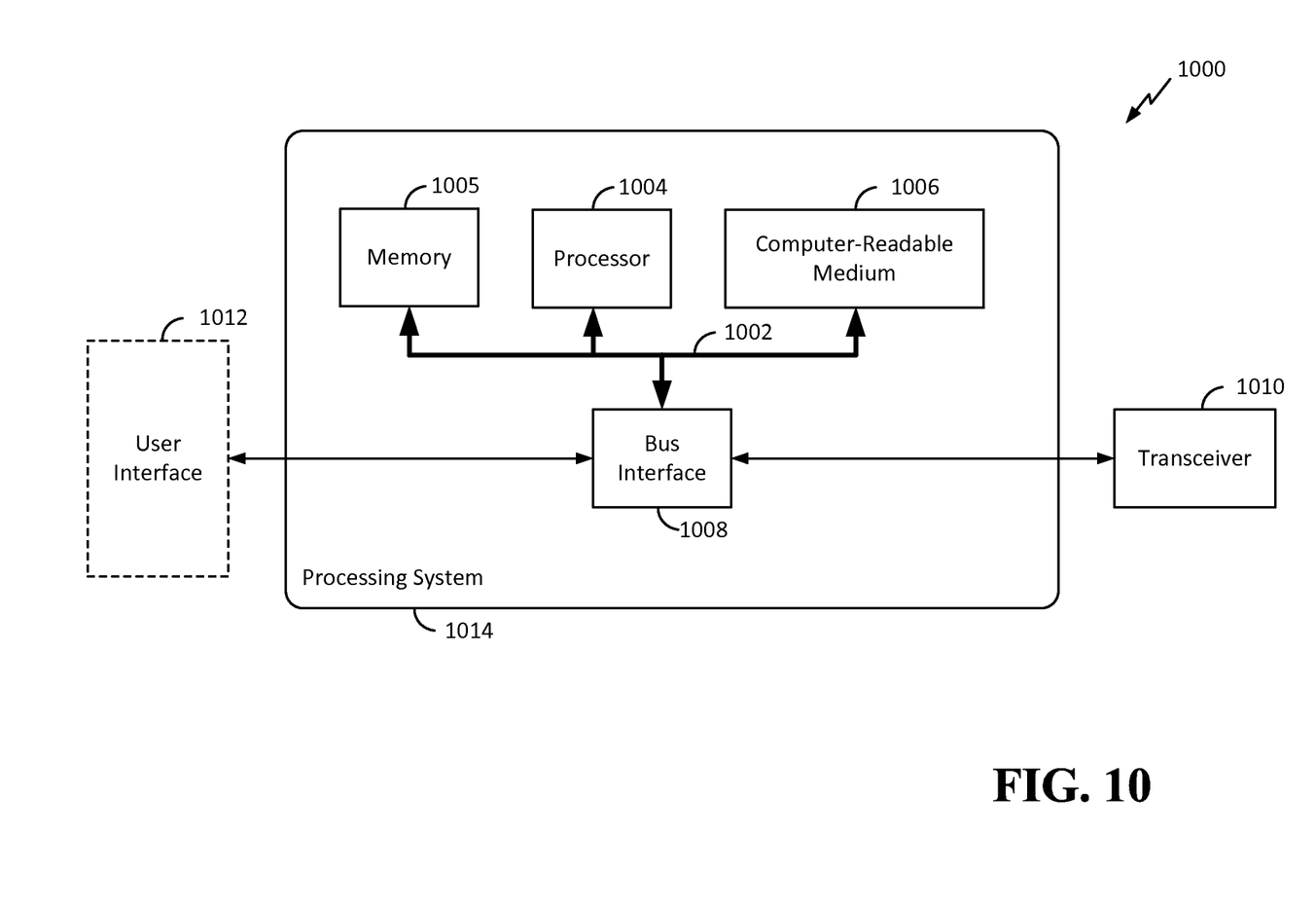
FIG. 10 is a block diagram illustrating an example of a hardware implementation for an apparatus employing a processing system in which the XBAR architecture of FIG. 4 may be used.

FIG. 10 is a conceptual diagram illustrating an example of a hardware implementation for an apparatus 1000 employing a processing system 1014. In accordance with various aspects of the disclosure, an element, or any portion of an element, or any combination of elements may be implemented with a processing system 1014 that includes one or more processors 1004 that may be implemented to be operational with an XBAR architecture such as the XBAR architecture 400. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium. Depending upon the nature of the apparatus, a user interface 1012 (e.g., keypad, display, speaker, microphone, joystick) may also be provided.

The processor 1004 is responsible for managing the bus 1002 and general processing, including the execution of software stored on the computer-readable medium 1006. The software, when executed by the processor 1004, causes the processing system 1014 to perform the various functions described infra for any particular apparatus. The computer-readable medium 1006 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. The computer-readable medium 1006 may be a non-transitory computer-readable medium such as a computer-readable storage medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 11:
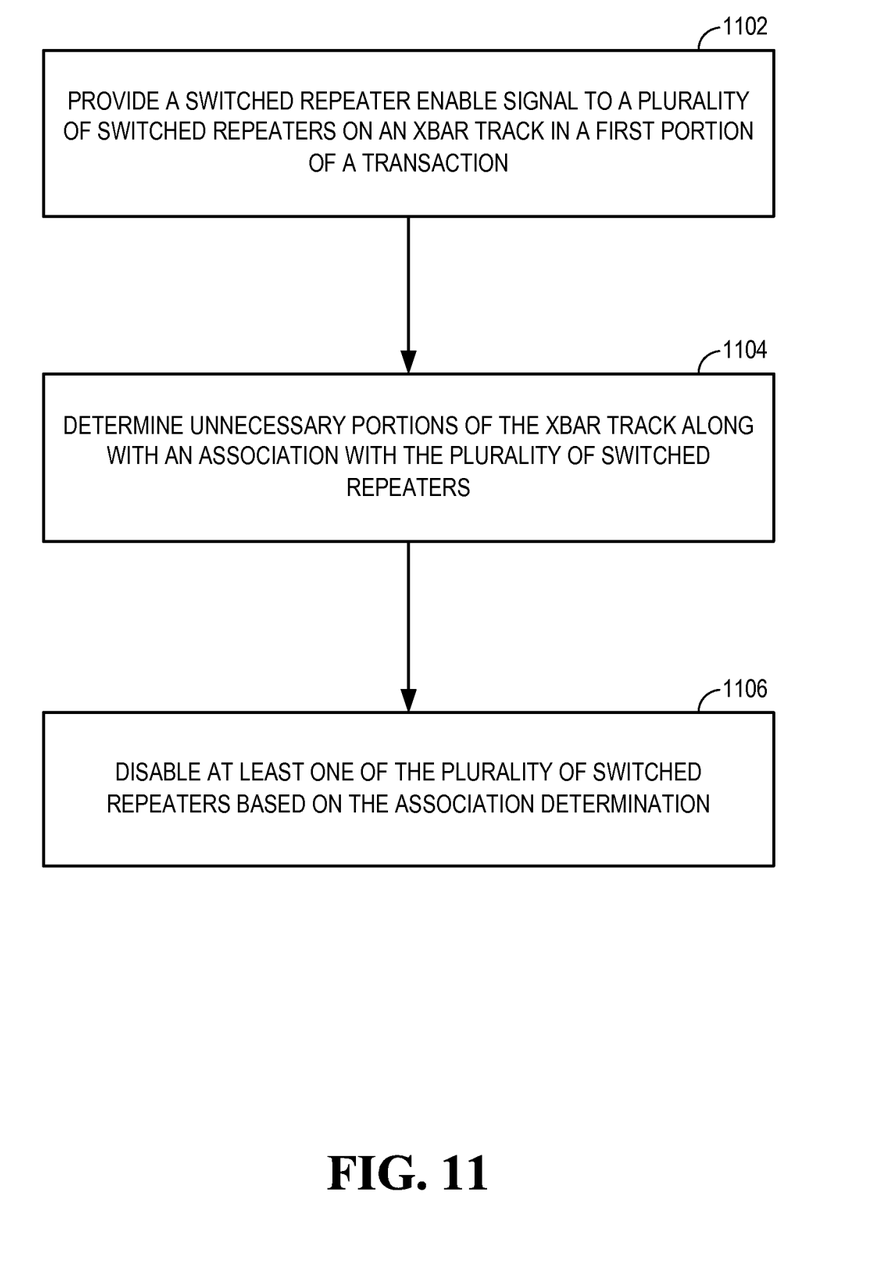
FIG. 11 is a flow diagram illustrating a method for reducing power on an XBAR according to an aspect of the present disclosure.

FIG. 11 illustrates a method for reducing active power consumption in an XBAR architecture. A switched repeater enable signal may be provided to a plurality of switched repeaters on an XBAR track in a first portion of a transaction at 1102. A determination of unnecessary portions of the XBAR track may be made and associated with the plurality of switched repeaters at 1104. At least one of the plurality of switched repeaters may be disabled at 1106 based on the determination. In one example, a portion of the XBAR track may be determined to be unnecessary if a client coupled to that portion of the XBAR track does not need to receive data.

Several aspects of a method and apparatus for dynamic power saving with flexible gating have been presented with reference to an XBAR architecture having a plurality of switched repeaters. As those skilled in the art will readily appreciate, various aspects described throughout this disclosure may be extended to other power saving methods, apparatus, and systems.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

One or more of the components, steps, features and/or functions illustrated in the FIGS. may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGS. may be configured to perform one or more of the methods, features, or steps described in the FIGS. Any novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A bus system, comprising:
   a set of first clients and a corresponding set of write buses;
   a set of second clients and a corresponding set of multiplexers, each second client being configured to selectively read from the write buses through its corresponding multiplexer; and
   wherein the multiplexers are arranged in succession from a beginning of the write buses to an end of the write buses, and wherein each write bus includes a plurality of switched repeaters distributed between the multiplexers;
   addressing logic configured to control the multiplexers so that a selected one of the second clients couples to the write bus of a broadcasting one of the first clients, and wherein the selected second client's multiplexer divides the broadcasting first client's write bus into a used portion and an unused portion including at least one of the switched repeaters; and
   control logic configured to disable the at least one switched repeater associated with the unused portion of the broadcasting first client's write bus.

2. The bus system of claim 1, wherein the switched repeaters each comprises at least one of a gated repeater or a latch repeater.

3. The bus system of claim 1, wherein the switched repeaters each comprises an associated logic gate configured to receive an enable signal from the control logic.

4. The bus system of claim 1, wherein the control logic is further configured to delay disabling the at least one switched repeater associated with the unused portion of the broadcasting first client's write bus until a predetermined event occurs.

5. The bus system of claim 4, wherein the predetermined event comprises at least one of a first transaction cycle or acquisition of repeater state information for the at least one switched repeater.

6. The bus system of claim 1, wherein the control logic is further configured to enable the at least one switched repeater until a predetermined event occurs.

7. The bus system of claim 6, wherein the predetermined event comprises at least one of a first transaction cycle or acquisition of repeater state information for the at least one switched repeater.

* * * * *